United States Patent
Kim et al.

(10) Patent No.: US 12,122,413 B2
(45) Date of Patent: Oct. 22, 2024

(54) METHOD FOR ESTIMATING DISTANCE TO AND LOCATION OF AUTONOMOUS VEHICLE BY USING MONO CAMERA

(71) Applicant: MOBILTECH, Seoul (KR)

(72) Inventors: Jae Seung Kim, Goyang-Si (KR); Do Yeong Im, Gwangmyeong-si (KR)

(73) Assignee: MOBILTECH, Seoul (KR)

( * ) Notice: Subject to any disclaimer, the term of this patent is extended or adjusted under 35 U.S.C. 154(b) by 821 days.

(21) Appl. No.: 17/282,950

(22) PCT Filed: Jun. 3, 2019

(86) PCT No.: PCT/KR2019/006644
§ 371 (c)(1),
(2) Date: Apr. 5, 2021

(87) PCT Pub. No.: WO2020/235734
PCT Pub. Date: Nov. 26, 2020

(65) Prior Publication Data
US 2021/0387636 A1 Dec. 16, 2021

(30) Foreign Application Priority Data
May 23, 2019 (KR) ........................ 10-2019-0060481

(51) Int. Cl.
*B60W 60/00* (2020.01)

(52) U.S. Cl.
CPC ..... *B60W 60/001* (2020.02); *B60W 2420/403* (2013.01); *B60W 2420/408* (2024.01);
(Continued)

(58) Field of Classification Search
CPC ......... B60W 60/001; B60W 2420/403; B60W 2420/408; B60W 2554/4041;
(Continued)

(56) References Cited

U.S. PATENT DOCUMENTS

2018/0164811 A1\* 6/2018 Yoo ...................... G05D 1/0278
2020/0098135 A1\* 3/2020 Ganjineh .................. G06T 7/74
(Continued)

FOREIGN PATENT DOCUMENTS

| KR | 10-1420684 B1 | 7/2014 |
| KR | 10-2015-0051735 A | 5/2015 |

(Continued)

OTHER PUBLICATIONS

Ra, Juhyeok et al., "A Study on Pedestrian and Vehicle Detection Algorithm by Integration of Camera and LIDAR Coordinate System." KSAE Annual Spring Conference, Feb. 6, 2020, pp. 528-529.

*Primary Examiner* — Thomas Ingram
(74) *Attorney, Agent, or Firm* — Bridgeway IP Law Group, PLLC; Jihun Kim

(57) ABSTRACT

Proposed is a method for estimating the distance to and the location of an autonomous vehicle by using a mono camera, and more particularly, a method that enables information necessary for autonomous travel to be efficiently acquired using a mono camera and LiDAR. In particular, the method can acquire sufficiently reliable information in real time without using expensive equipment, such as a high-precision GPS receiver or stereo camera, required for autonomous travel. Consequently, the method may be widely used in ADAS, such as for semantic information recognition for autonomous travel, estimation of the location of an autonomous vehicle, calculation of vehicle-to-vehicle distance, or the like, even without the use of GPS, and furthermore, a camera capable of performing the same functions can be developed by developing software through the use of the corresponding data.

5 Claims, 7 Drawing Sheets

(52) U.S. Cl.
CPC ............... *B60W 2554/4041* (2020.02); *B60W 2554/4049* (2020.02)

(58) Field of Classification Search
CPC .......... B60W 2554/4049; G01S 7/4808; G01S 17/86; G01S 17/931; G06V 20/58; G05D 1/0246; G05D 1/0212; G05D 1/0248; G05D 1/0268
See application file for complete search history.

(56) References Cited

U.S. PATENT DOCUMENTS

| | | | |
|---|---|---|---|
| 2020/0167941 A1* | 5/2020 | Tong | ........................ G01S 13/89 |
| 2023/0273302 A1* | 8/2023 | Kang | .................... G01S 7/4865 |
| | | | 356/4.01 |

FOREIGN PATENT DOCUMENTS

| | | |
|---|---|---|
| KR | 10-2017-0057684 A | 5/2017 |
| KR | 10-1765746 B1 | 8/2017 |
| KR | 10-2018-0019309 A | 2/2018 |
| KR | 10-2018-0068490 A | 6/2018 |

* cited by examiner

METHOD FOR ESTIMATING DISTANCE TO AND LOCATION OF AUTONOMOUS VEHICLE BY USING MONO CAMERA

TECHNICAL FIELD

The present invention relates to a method of estimating a distance and a location of an autonomous vehicle using a mono camera, and more specifically, to a method that can efficiently acquire information needed for autonomous driving using a mono camera and LiDAR.

Particularly, the present invention relates to a method of estimating a distance and a location of an autonomous vehicle using a mono camera, which can acquire information having sufficient reliability in real-time without using expensive equipment such as a high-precision GPS receiver, a stereo camera or the like required for autonomous driving.

BACKGROUND ART

Unmanned autonomous driving of a vehicle (autonomous vehicle) largely includes the step of recognizing a surrounding environment (cognitive domain), the step of planning a driving route from the recognized environment (determination domain), and the step of driving along the planned route (control domain).

Particularly, in the case of the cognitive domain, it is a basic technique performed first for autonomous driving, and techniques in the next steps of the determination domain and the control domain can be accurately performed only when the technique in the cognitive domain is performed accurately.

The technique of the cognitive domain includes a technique of identifying an accurate location of a vehicle using GPS, and a technique of acquiring information on a surrounding environment through image information acquired through a camera.

First, in autonomous driving, the error range of GPS about the location of a vehicle should be smaller than the width of a lane, and although the smaller the error range, the more efficiently it can be used for real-time autonomous driving, a high-precision GPS receiver with such a small error range is expensive inevitably.

As one of techniques for solving the problem, Positioning method and system for autonomous driving agricultural unmanned tractor using multiple low-cost GPS' (hereinafter, referred to as 'prior art 1') disclosed in Korean Patent Publication No. 10-1765746, which is a prior art document, may secure precise location data using a plurality of low-cost GPSs by complementing a plurality of GPS location information with each other based on a geometric structure.

However, in the prior art 1, since a plurality of GPS receivers should operate, it is natural that the cost is subject to increase as much as the number of GPS receivers.

In addition, since a plurality of GPS receivers needs to be interconnected, the configuration of the devices and the data processing processes are inevitably complicated, and the complexity may work as a factor that lowers reliability of the devices.

Next, as a technique for obtaining information on the surrounding environment, 'Automated driving method based on stereo camera and apparatus thereof' (hereinafter referred to as 'prior technology 2') disclosed in Korean Patent Publication No. 10-2018-0019309, which is a prior art document, adjusts a depth measurement area by adjusting the distance between two cameras constituting a stereo camera according to driving conditions of a vehicle (mainly, the driving speed).

As described above, the technique using a stereo camera also has a problem similar to that of the cited invention 1 described above since the device is expensive and accompanied with complexity of device configuration and data processing.

In addition, in a technique like the cited invention 2, the accuracy depends on the amount of image-processed data. However, since the amount of data should be reduced for real-time data processing, there is a disadvantage in that the accuracy is limited.

DISCLOSURE OF INVENTION

Technical Problem

Therefore, the present invention has been made in view of the above problems, and it is an object of the present invention to provide a method of estimating a distance and a location of an autonomous vehicle using a mono camera, which can efficiently acquire information needed for autonomous driving using a mono camera and LiDAR.

More specifically, an object of the present invention is to provide a method of estimating a distance and a location of an autonomous vehicle using a mono camera, which can estimate a relative location of an object (an object for autonomous driving or a target object) with respect to a vehicle required for autonomous driving in real-time by accurately calculating a distance from the ground to a specific location using an image captured by the mono camera and information collected by the LiDAR.

Particularly, an object of the present invention is to provide a method of estimating a distance and a location of an autonomous vehicle using a mono camera, which can acquire information having sufficient reliability in real-time without using expensive equipment such as a high-precision GPS receiver, a stereo camera or the like required for autonomous driving.

Technical Solution

To accomplish the above objects, according to one aspect of the present invention, there is provided a method of estimating a distance of an autonomous vehicle using a mono camera, the method comprising: a video image acquisition step of acquiring a two-dimensional video image captured by the mono camera; a LiDAR data acquisition step of acquiring ground data measured by a three-dimensional LiDAR; a coordinate system matching step of matching a two-dimensional pixel of the video image and a coordinate system of the three-dimensional LiDAR; and an object distance estimation step of estimating, when a target object is located on a ground of the video image, a distance to the object based on a LiDAR coordinate value matched to a pixel where the target object is located.

In addition, the video image acquisition step may include: a video capturing process of capturing a video by the mono camera; and a lens distortion correction process of correcting distortion generated by a lens of the mono camera for the captured video.

In addition, the coordinate system matching step may include: a data overlapping process of overlapping the video image and the ground data; a direct matching process of setting, in the case of a pixel overlapped with the ground data, the ground data as a LiDAR coordinate value of the pixel; and an extended matching process of setting, in the case of a pixel that does not overlapped with the ground data, a LiDAR coordinate value by estimating from the ground data.

In addition, at the extended matching process, in the case of a pixel that is not overlapped with the ground data, a coordinate value of the corresponding pixel may be set by estimating from adjacent ground data using a linear interpolation method.

In addition, a method of estimating a distance of an autonomous vehicle using a mono camera according to the present invention comprises: a relative location calculation step of calculating a relative location with respect to an object for autonomous driving by image-processing a two-dimensional video image captured by the mono camera; a target object confirmation step of confirming the object for autonomous driving on a HD-map for autonomous driving; and a vehicle location confirmation step of confirming a current location of the vehicle by applying the relative location with respect to the object for autonomous driving on the HD-map for autonomous driving.

In addition, the relative location calculation step may include: a two-dimensional image acquisition process of acquiring a two-dimensional video image of a specific direction using the mono camera; an object location calculation process of confirming an object for autonomous driving included in the two-dimensional image, and estimating a direction and a distance to the object for autonomous driving; and a vehicle location calculation process of estimating a relative location of the vehicle based on the object for autonomous driving.

In addition, the relative location calculation step may include: a two-dimensional image acquisition process of acquiring a two-dimensional video image of a specific direction using the mono camera; an object location calculation process of confirming an object for autonomous driving included in the two-dimensional image, and estimating distances to at least three objects for autonomous driving; and a vehicle location calculation process of estimating a relative location of the vehicle based on the objects for autonomous driving.

In addition, at the object location calculation process, a ground data measured by three-dimensional LiDAR may be matched for each pixel of the two-dimensional image, and at least one among the distance and the direction to a corresponding object for autonomous driving may be estimated based on a LiDAR coordinate value of the pixel matched with the ground data.

In addition, at the object location calculation process, in the case of a pixel overlapped with the ground data, the ground data may be set as the LIDAR coordinate value of the pixel after overlapping the two-dimensional image and the ground data, and in the case of a pixel that does not overlapped with the ground data, the LIDAR coordinate value may be set by estimating from the ground data.

In addition, at the object location calculation process, in the case of a pixel that does not overlapped with the ground data, a coordinate value of a corresponding pixel may be set by estimating from adjacent ground data using a linear interpolation method.

Advantageous Effects

By the solutions described above, the present invention has an advantage of efficiently acquiring information needed for autonomous driving using a mono camera and LiDAR.

More specifically, the present invention has an advantage of estimating a relative location of an object (an object for autonomous driving or a target object) with respect to a vehicle required for autonomous driving in real-time by accurately calculating a distance from the ground to a specific location using an image captured by the mono camera and information collected by the LiDAR.

Particularly, when only the captured image is used simply, an object in the image is recognized through image processing, and a distance to the object is estimated. At this point, since the amount of data to be processed increases significantly as the accuracy of required distance increases, there is a limit in processing the data in real-time.

Contrarily, since only information on the area of the ground is required from the captured image, the present invention has an advantage of minimizing the data needed for image analysis and processing the data in real-time.

Accordingly, the present invention has an advantage of acquiring information having sufficient reliability in real-time without using expensive equipment such as a high-precision GPS receiver, a stereo camera or the like required for autonomous driving.

In addition, the present invention has an advantage of significantly reducing data processing time compared with expensive high-definition LiDAR that receives millions of points per second.

In addition, since LiDAR data measured as a vehicle moves has an error according to the relative speed and an error generated due to shaking of the vehicle, the accuracy also decreases, whereas since a two-dimensional image in a static state (captured image) and three-dimensional relative coordinates match each other, the present invention has an advantage of high accuracy.

In addition, together with the disadvantage of being limited since calculation of a distance using the depth of a stereo camera may estimate the distance through a pixel that can be distinguished from the surroundings, such as a feature point or a boundary of an image, it is difficult to express an accurate value since it is calculation of a distance using triangulation, whereas since the present invention is a technique for an object located on the ground, there is an advantage of calculating a distance within a considerably reliable error range.

As described above, the present invention can be widely used for an advanced driver assistance system (ADAS) or the like for the purpose of estimation of a current location of an autonomous vehicle, calculation of a distance between vehicles or the like through recognition of semantic information (autonomous driving object, etc.) for autonomous driving without using GPS, and furthermore has an advantage of developing a camera that can perform the same function by developing software using corresponded data.

BEST MODE FOR CARRYING OUT THE INVENTION

Examples of a method of estimating a distance and a location of an autonomous vehicle using a mono camera according to the present invention may be diversely applied, and particularly, the method may be used in an autonomous driving system mounted on a vehicle or in an image processing device, an image processing module, a vehicle control device, an autonomous driving module, a digital map mapping module and the like for autonomous driving.

Accordingly, the present invention may be performed in various systems or devices that utilize a high-definition map (HD-map) for autonomous driving, and hereinafter, a most preferred embodiment will be described with reference to the accompanying drawings.

Figure 1:
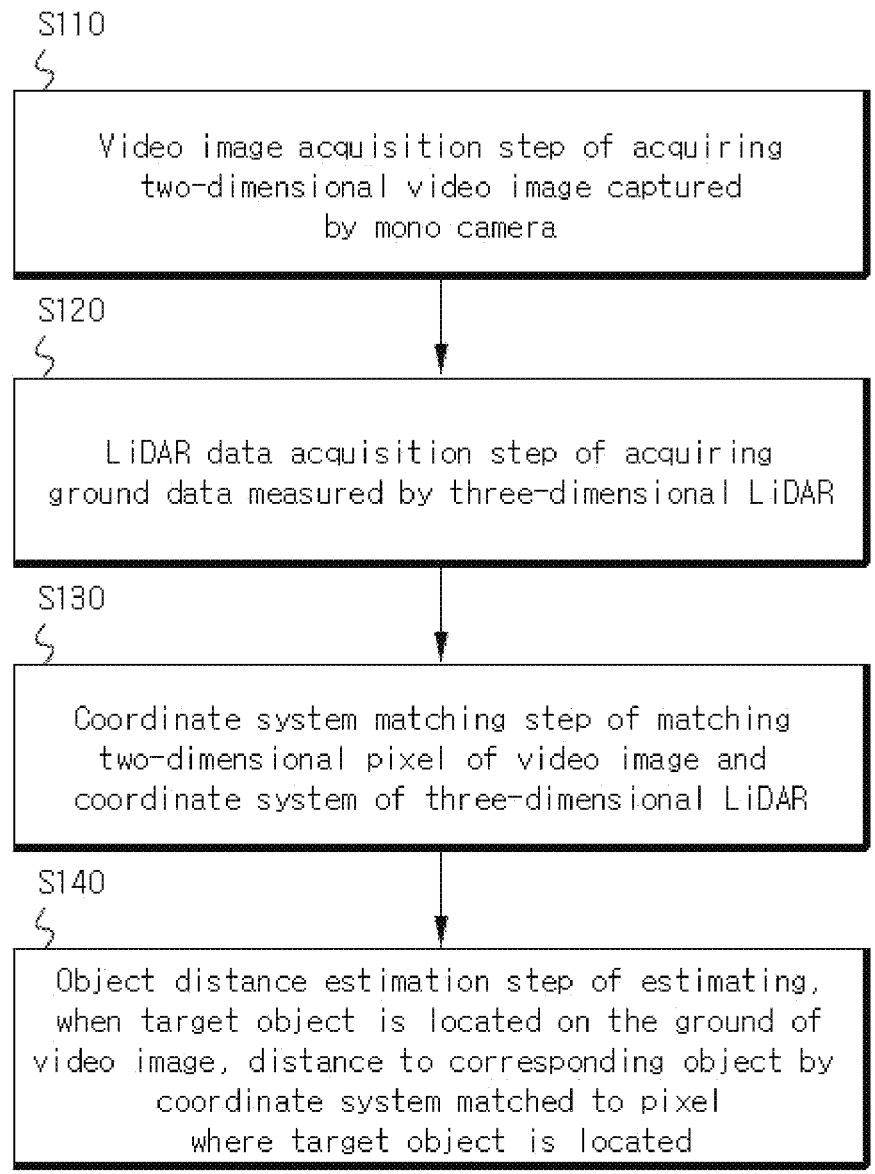
FIG. 1 is a flowchart illustrating an embodiment of a method of estimating a distance of an autonomous vehicle using a mono camera according to the present invention.

FIG. 1 is a flowchart illustrating an embodiment of a method of estimating a distance of an autonomous vehicle using a mono camera according to the present invention.

Referring to FIG. 1, a method of estimating a distance of an autonomous vehicle using a mono camera of the present invention includes a video image acquisition step (S110), a LiDAR data acquisition step (S120), a coordinate system matching step (S130), and an object distance estimation step (S140).

First, at the video image acquisition step (S110), a two-dimensional video image (two-dimensional image) captured by a mono camera may be acquired.

Figure 4A:
FIGS. 4A to 5B are images illustrating the process of FIG. 1.

At this point, the two-dimensional video image (two-dimensional image) refers to an image in which the ground is captured in a predetermined lower area as shown in FIG. 4A.

Accordingly, in the present invention, since it is not that the entire video image captured through image processing is image-processed and analyzed, but that the lower ground part is extracted as a target area, the amount of data required for image processing can be drastically reduced.

Figure 4B:
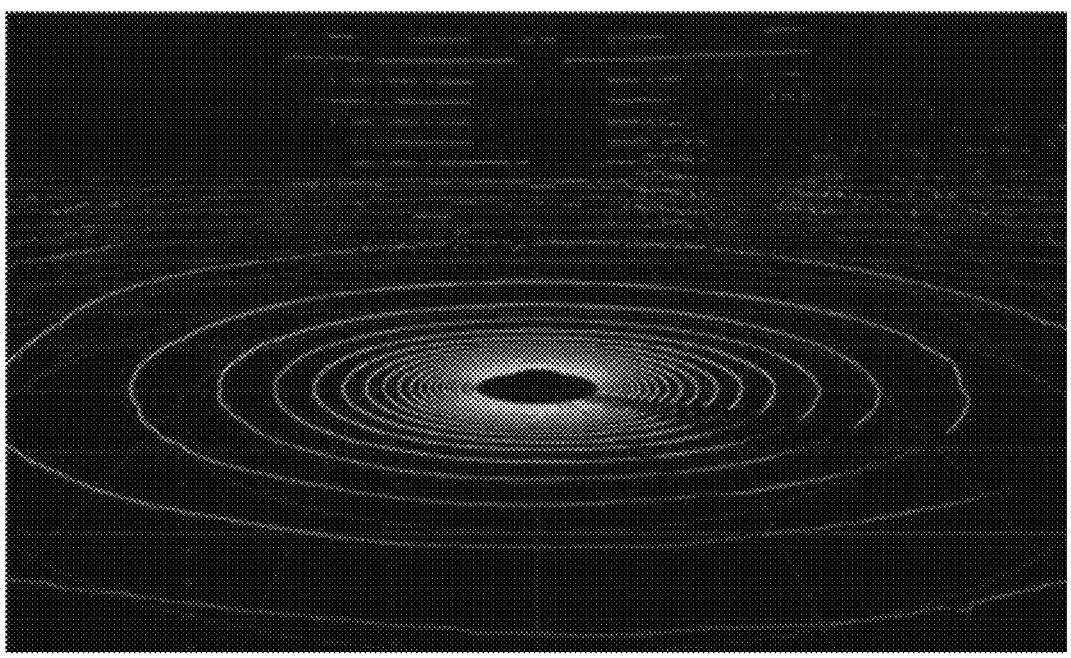

At the LiDAR data acquisition step (S120), ground data measured by three-dimensional LiDAR around a corresponding vehicle may be acquired as shown in FIG. 4B.

Figure 5A:

At the coordinate system matching step (S130), the video image and the ground data may match as shown in FIG. 5A while going through a process of matching a two-dimensional pixel of the previously acquired video image and the coordinate system of the three-dimensional LiDAR.

Finally, at the object distance estimation step (S140), when a target object (an object for autonomous driving) is located on the ground of a video image, the distance to the object is estimated based on the LiDAR coordinate value matched to the pixel where the target object is located.

Therefore, the distance to the target object located on the ground can be quickly and accurately calculated while minimizing the amount of data for processing the acquired video image.

Figure 2:
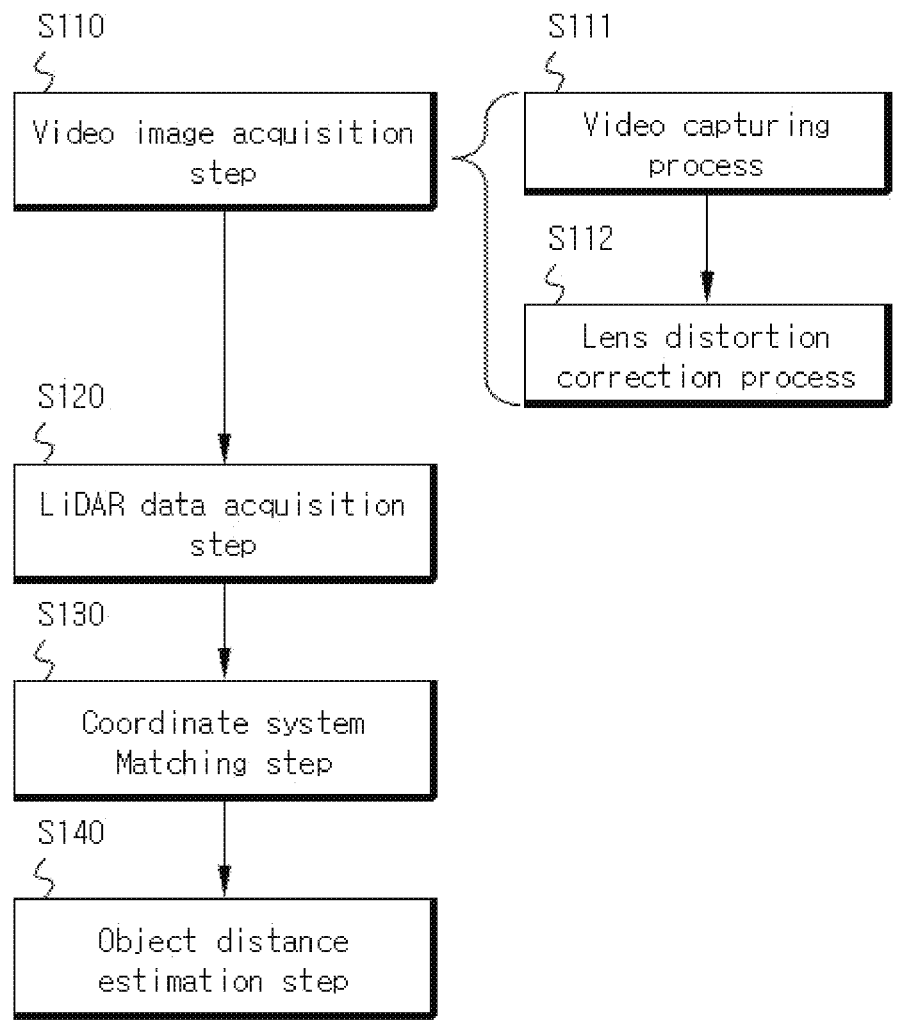
FIG. 2 is a flowchart illustrating a specific embodiment of step S110 of FIG. 1.

FIG. 2 is a flowchart illustrating a specific embodiment of step S110 of FIG. 1.

Referring to FIG. 2, the video image acquisition step (S110) may include a video capturing process (S111) and a lens distortion correction process (S112).

Generally, since an image captured by a lens is highly distorted from the center of the lens toward the edge, a process of correcting the distorted part is needed to match with a device that collects three-dimensional information, such as LiDAR.

Accordingly, when a video in a specific direction is captured by a mono camera (S111), a process of correcting the distortion generated by the lens of the mono camera is performed on the captured video (S112).

The image correction process like this may be performed by the mono camera itself, and in this case, the load on the computational processing in the process of image-processing performed on the image captured by the mono camera may be reduced.

On the other hand, in the case of LiDAR, the resolution is determined by the number of laser channels, and as described above, when the amount of data acquired by the LiDAR increases, a significant load may be generated in the computational processing, and this may generate an undesirable situation in processing the data in real-time.

Hereinafter, a method for solving this problem will be described.

Figure 3:
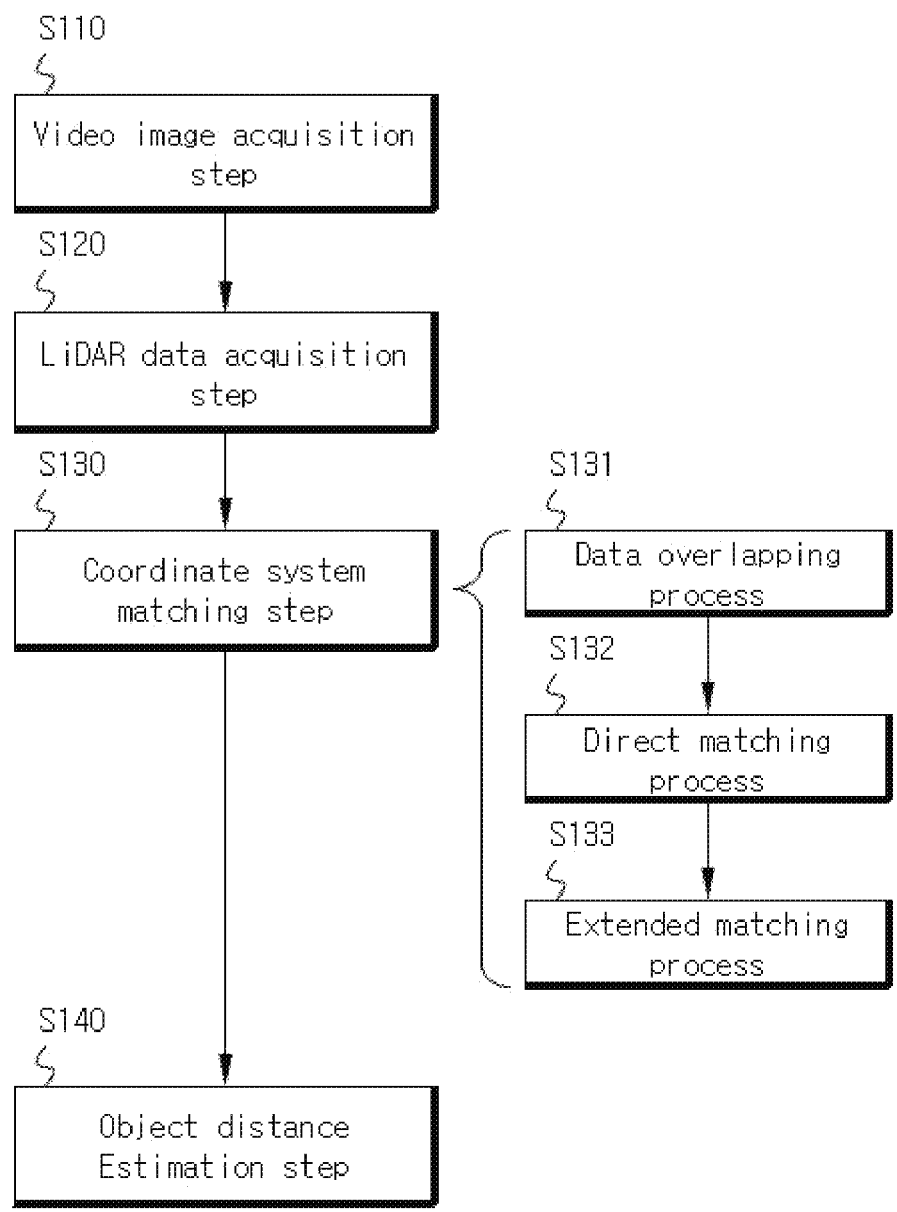
FIG. 3 is a flowchart illustrating a specific embodiment of step S130 of FIG. 1.

FIG. 3 is a flowchart illustrating a specific embodiment of step S130 of FIG. 1.

Referring to FIG. 3, the coordinate system matching step (S130) may include a data overlapping process (S131), a direct matching process (S132), and an extended matching process (S133).

For example, when the video image and the ground data are overlapped as shown in FIG. 5A (S131), it is possible to know the exact location of a pixel in the video image where ground data exists.

In other words, in the case of a pixel of the video image overlapped with the ground data, the ground data may be set as the LiDAR coordinate value of the pixel (S132).

However, the exact location of pixels between the ground data shown in FIG. 5A cannot be identified by the LiDAR.

Accordingly, in the case of a pixel that is not overlapped with the ground data among the pixels of the video image, the LiDAR coordinate value of the pixel may be set in a method of estimating by expanding from the ground data (S133).

For example, at the extended matching process (S133), in the case of a pixel that is not overlapped with the ground data, a coordinate value of the corresponding pixel may be set by estimating from adjacent ground data using a linear interpolation method. Here, the linear interpolation method refers to a method of linearly calculating a value located between two points when the values of the two points are known.

Figure 5B:

Through the process like this, it is possible to find out the LiDAR coordinate values of all pixels for the ground area of a two-dimensional video image as shown in FIG. 5B.

Hereinafter, a method of finding out the current location of a vehicle on a digital map, such as a HD-map for autonomous driving, will be described using the distance and direction of a target object (an object for autonomous driving) confirmed using a LiDAR coordinate value as described above.

Figure 6:
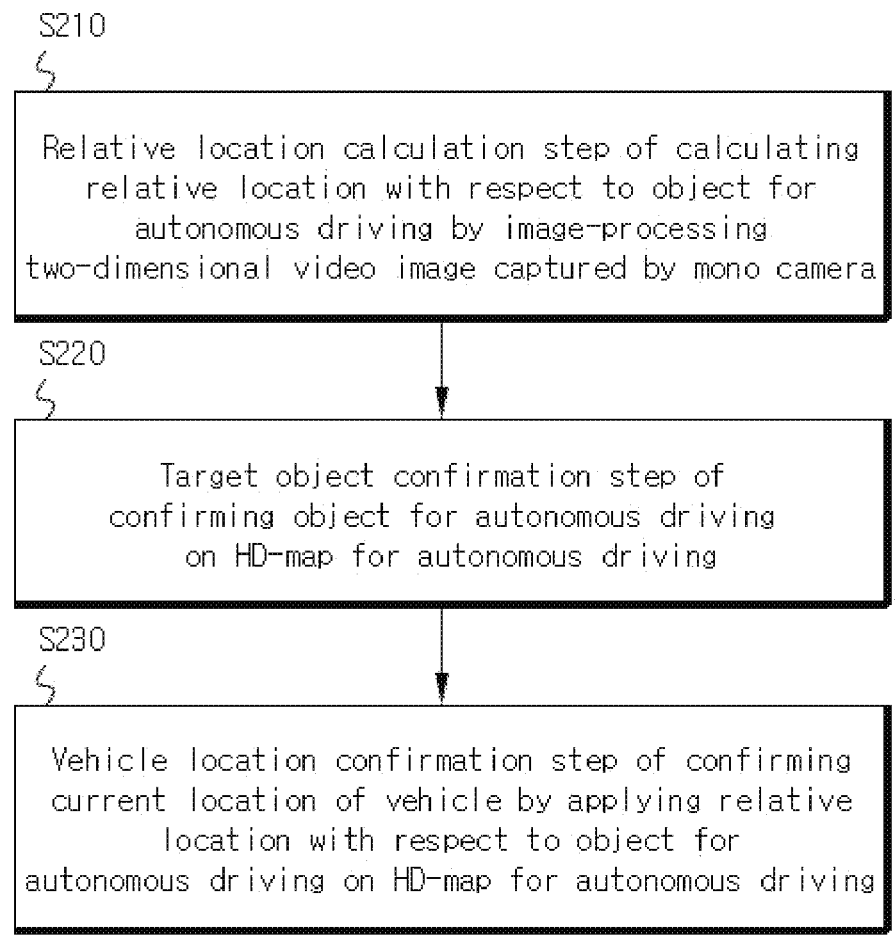
FIG. 6 is a flowchart illustrating an embodiment of a method of estimating a location of an autonomous vehicle using a mono camera according to the present invention.

FIG. 6 is a flowchart illustrating an embodiment of a method of estimating a location of an autonomous vehicle using a mono camera according to the present invention.

Referring to FIG. 6, a method of estimating a location of an autonomous vehicle using a mono camera of the present invention includes a relative location calculation step (S210), a target object confirmation step (S220), and a vehicle location confirmation step (S230).

At the relative location calculation step (S210), a two-dimensional video image (two-dimensional image) captured by the mono camera may be image-processed to calculate a relative location with respect to an object for autonomous driving (target object).

At the target object confirmation step (S220), the object for autonomous driving and the location of the object may be confirmed on the HD-map for autonomous driving.

Thereafter, at the vehicle location confirmation step (S230), the current location of the vehicle may be confirmed on the HD-map for autonomous driving by applying the relative location with respect to the object for autonomous driving on the HD-map for autonomous driving.

Hereinafter, it will be described in more detail.

Figure 7:
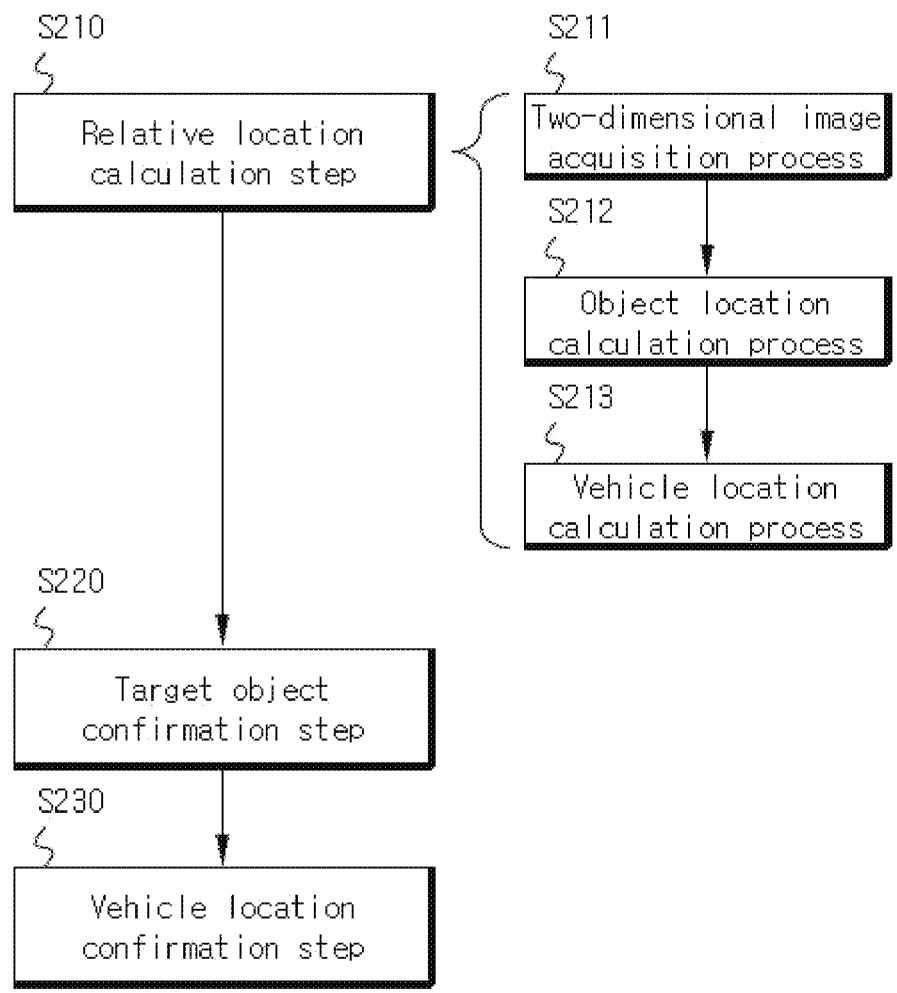
FIG. 7 is a flowchart illustrating a specific embodiment of step S210 of FIG. 6.

FIG. 7 is a flowchart illustrating a specific embodiment of step S210 of FIG. 6.

Referring to FIG. 7, the relative location calculation step (S210) may include a two-dimensional image acquisition process (S211), an object location calculation process (S212), and a vehicle location calculation process (S213).

For example, in the case where information on the distance and direction to a specific location can be obtained from LiDAR, when a two-dimensional image, which is a two-dimensional video image of a specific direction, is acquired using a mono camera (S211) at the relative location calculation step (S210), the object for autonomous driving included in the two-dimensional image may be confirmed, and the direction and the distance from the vehicle to the object for autonomous driving are estimated (S212), and then the relative location of the vehicle may be estimated based on the object for autonomous driving (S213).

As another example, in the case where only information on the distance from the LiDAR to a specific location can be obtained or only distance information excluding direction information is used after the distance information and the direction information are obtained, when a two-dimensional image, which is a two-dimensional video image of a specific direction, is acquired using a mono camera (S211) at the relative location calculation step (S210), the object for autonomous driving included in the two-dimensional image may be confirmed, and the distances to at least three objects for autonomous driving are estimated (S212), and then the relative location of the vehicle may be estimated based on the objects for autonomous driving (S213).

More specifically, at the object location calculation process (S212), as described above with reference to FIGS. 1 to 5, the ground data measured by three-dimensional LiDAR is matched for each pixel of the two-dimensional image, and at least one among the distance and the direction to a corresponding object for autonomous driving may be estimated based on the LiDAR coordinate value of the pixel matched with the ground data.

Then, in the case of a pixel overlapped with the ground data, the ground data may be set as the LIDAR coordinate value of the pixel after the two-dimensional image and the ground data are overlapped, and in the case of a pixel that does not overlapped with the ground data, the LIDAR coordinate value may be set by estimating from the ground data.

In the case of a pixel that does not overlapped with the ground data, a coordinate value of the corresponding pixel may be set by estimating from adjacent ground data using a linear interpolation method.

Accordingly, the present invention may provide an optimal method in the field of autonomous driving in which data should be processed in real-time as accurate estimation of a distance and a location is allowed while minimizing the amount of computational processing of data.

Accordingly, in the present invention, information having sufficient reliability may be acquired in real-time without using expensive equipment such as a high-precision GPS receiver, a stereo camera or the like required for autonomous driving.

A method of estimating a distance and a location of an autonomous vehicle using a mono camera according to the present invention has been described above. It will be appreciated that those skilled in the art may implement the technical configuration of the present invention in other specific forms without changing the technical spirit or essential features of the present invention.

Therefore, it should be understood that the embodiments described above are illustrative and not restrictive in all respects.

INDUSTRIAL APPLICABILITY

The present invention can be used in the field of autonomous driving, object recognition for autonomous driving, location tracking of autonomous vehicles, as well as in the similar or related fields, and may improve the reliability and competitiveness of products in the field.

The invention claimed is:

1. A method of estimating a distance of an autonomous vehicle using a mono camera, the method comprising:
    a relative location calculation step of calculating a relative location with respect to an object for autonomous driving by image-processing a two-dimensional video image captured by the mono camera;
    a target object confirmation step of confirming the object for autonomous driving on a HD-map for autonomous driving; and
    a vehicle location confirmation step of confirming a current location of a vehicle by applying the relative location with respect to the object for autonomous driving on the HD-map for autonomous driving,
    wherein the relative location calculation step includes:
    a two-dimensional image acquisition process of acquiring a two-dimensional video image of a specific direction using the mono camera;
    an object location calculation process of confirming the object for autonomous driving included in the two-dimensional video image, and estimating a direction and a distance to the object for autonomous driving; and
    a vehicle location calculation process of estimating a relative location of the vehicle based on the object for autonomous driving, and
    wherein at the object location calculation process, a ground data measured by a three-dimensional LiDAR is matched with each pixel of the two-dimensional video image, and at least one of the direction and the distance to the object for autonomous driving is estimated based on a LiDAR coordinate value of the ground data matched to a pixel where the object is located.

2. The method according to claim 1, wherein at the object location calculation process, when the pixel is overlapped with the ground data, the ground data is set as the LIDAR coordinate value of the pixel after overlapping the two-dimensional video image and the ground data, and when the pixel is not overlapped with the ground data, the LIDAR coordinate value is set by estimating from the ground data.

3. The method according to claim 2, wherein at the object location calculation process, when the pixel is not overlapped with the ground data, a coordinate value of a corresponding pixel is set by estimating from adjacent ground data using a linear interpolation method.

4. A method of estimating a distance of an autonomous vehicle using a mono camera, the method comprising:
- a relative location calculation step of calculating a relative location with respect to an object for autonomous driving by image-processing a two-dimensional video image captured by the mono camera;
- a target object confirmation step of confirming the object for autonomous driving on a HD-map for autonomous driving; and
- a vehicle location confirmation step of confirming a current location of a vehicle by applying the relative location with respect to the object for autonomous driving on the HD-map for autonomous driving,
- wherein the relative location calculation step includes:
- a two-dimensional image acquisition process of acquiring a two-dimensional video image of a specific direction using the mono camera;
- an object location calculation process of confirming the object for autonomous driving included in the two-dimensional video image, and estimating distances to at least three objects for autonomous driving; and
- a vehicle location calculation process of estimating a relative location of the vehicle based on the at least three objects for autonomous driving.

5. The method according to claim 4, wherein at the object location calculation process, a ground data measured by a three-dimensional LiDAR is matched with each pixel of the two-dimensional video image, and directions to the at least three objects for autonomous driving are estimated based on LiDAR coordinate values of the ground data matched to pixels where the at least three objects are located.

* * * * *